(12) United States Patent
Iizuka et al.

(10) Patent No.: US 6,540,446 B2
(45) Date of Patent: Apr. 1, 2003

(54) CYLINDRICAL CUTTING BLADE AND CUTTER HEAD ASSEMBLY WHICH CARRIES THE CUTTING BLADE

(75) Inventors: Tsunesuke Iizuka, Nagoya (JP); Junichi Moriyama, Nagoya (JP); Ryunosuke Tsunenoki, Nisshin (JP)

(73) Assignee: Yutaka Seimitsu Kogyo, Ltd., Seto (JP)

( * ) Notice: Subject to any disclaimer, the term of this patent is extended or adjusted under 35 U.S.C. 154(b) by 0 days.

(21) Appl. No.: 09/822,422

(22) Filed: Apr. 2, 2001

(65) Prior Publication Data

US 2001/0028831 A1 Oct. 11, 2001

(30) Foreign Application Priority Data

Oct. 6, 2000 (JP) .......................... 2000-308082
Apr. 6, 2000 (JP) .......................... 2000-105185

(51) Int. Cl.[7] .............................. B23C 5/20; B26D 1/12
(52) U.S. Cl. ............................................ 407/21; 407/113
(58) Field of Search ................................ 407/21, 22, 29, 407/40, 41, 47, 49, 61, 106, 36, 34, 44, 43, 46, 107

(56) References Cited

U.S. PATENT DOCUMENTS

| | | | |
|---|---|---|---|
| 3,163,920 A | * | 1/1965 | Stier |
| 3,289,275 A | * | 12/1966 | Kulson |
| 4,449,556 A | * | 5/1984 | Colton ........................ 144/230 |
| 4,575,285 A | | 3/1986 | Blakesley |
| 4,575,286 A | | 3/1986 | Blakesley |
| 4,621,954 A | * | 11/1986 | Kitchen et al. ................ 407/22 |
| 4,936,516 A | * | 6/1990 | Hench .......................... 241/294 |
| 4,938,638 A | * | 7/1990 | Hessman et al. .............. 407/39 |
| 5,022,795 A | * | 6/1991 | Stampfli et al. ............... 407/47 |
| 5,934,841 A | * | 8/1999 | Rutschke et al. .............. 407/22 |
| 6,004,078 A | * | 12/1999 | Clark et al. ................... 407/21 |
| 6,030,153 A | * | 2/2000 | Votsch et al. ................. 407/36 |

FOREIGN PATENT DOCUMENTS

JP      A 10-58232      3/1998

* cited by examiner

Primary Examiner—Derris H. Banks
Assistant Examiner—Jamila O Williams
(74) Attorney, Agent, or Firm—Oliff & Berridge, PLC

(57) ABSTRACT

A cutter head assembly including: (a) a main body which has a cutting-blade receiving bore and a clamping-member receiving bore partially interfering with the cutting-blade receiving bore; (b) a cutting blade received in the cutting-blade receiving bore and having a flat surface as a part of an outer circumferential surface thereof and parallel to an axis of the cutting blade; and (c) a cylindrical clamping member received in the clamping-member receiving bore and having a fitting portion and a cam portion. The cylindrical clamping member is fitted at the fitting portion in the clamping-member receiving bore. The cam portion has a cam surface whose radial distance from an axis of the fitting portion changes in a circumferential direction of the cylindrical clamping member. The cylindrical clamping member is rotatable about the axis of the fitting portion so that the cam surface is brought into contact with the flat surface of the cutting blade, for thereby pressing the cutting blade onto an inner circumferential surface of the cutting-blade receiving bore.

22 Claims, 9 Drawing Sheets

CYLINDRICAL CUTTING BLADE AND CUTTER HEAD ASSEMBLY WHICH CARRIES THE CUTTING BLADE

BACKGROUND OF THE INVENTION

1. Field of the Invention

The present invention relates to a cylindrical cutting blade, and a cutter head assembly including a main body which holds the cylindrical cutting blade and is rotated to machine a workpiece.

2. Discussion of Related Art

As an example of such a cutter head assembly, JP-A-10-58232 discloses a face milling or hobbing cutter used in a gear cutting operation in which a spiral bevel gear, a hypoid gear or other bevel gear having curved teeth is machined or cut in accordance with a so-called "forming method (non-generating method)" or "generating method". This cutter includes (a) a disk-shaped main body which is to be rotated about its axis, (b) a plurality of cylindrical cutting blades and (c) a clamping device for fixing each cutting blade to the main body. The main body has a plurality of cutting-blade receiving bores and wedge-member receiving bores all of which have respective circular shapes in their cross sections. Each of the cutting-blade receiving bores is offset from the axis and extends substantially parallel to the axis, while each of the wedge-member receiving bores extends in a direction not parallel to the axis so as to intersects with the corresponding one of the cutting-blade receiving bores. Each of the cutting-blade receiving bores interferes with the corresponding two of the wedge-member receiving bores which are positioned to be spaced apart from each other in a direction in which the cutting-blade receiving bore extends. Each of the cylindrical cutting blades has a predetermined diameter which enables the cylindrical cutting blade to be fitted into the cutting-blade receiving bore, and a flat surface in its outer circumferential surface. The flat surface is parallel to the axis of the cylindrical cutting blade, and is formed by removing a portion of the cylindrical cutting blade which is located on one of opposite sides of the flat surface remote from the axis. Each cylindrical cutting blade further has, in its axially distal end portion, a cutting edge defined by an intersection of a flank face and a rake face which is constituted by the flat surface.

The clamping device includes a generally cylindrical wedge member which is fitted in the wedge-member receiving bore such that the wedge member is slidably movable relative to the receiving bore in the axial direction of the receiving bore, and a moving mechanism for moving the wedge member relative to the receiving bore in the axial direction. The wedge member has a positioning surface which is inclined with respect to the axis of the wedge member. When the wedge member is forwardly moved by the moving mechanism, the positioning surface of the wedge member is brought into abutting contact with the flat surface of the cylindrical cutting blade, for thereby holding the cutting blade in a predetermined angular position relative to the cutting-blade receiving bore while pressing the cylindrical cutting blade onto an inner circumferential surface of the receiving bore owing to a wedge effect. The cylindrical cutting blade is thus fixed to the disk-shaped main body. It is noted that the moving mechanism is provided by an externally threaded member and an internally threaded member which are held in engagement with each other. One of the externally and internally threaded members is rotatable relative to the wedge member.

This cutter head assembly disclosed in JP-A-10-58232 has a construction more simple than that of a conventional cutter head assembly, and an excellent capability to fix the cutting blades to the main body. However, the present inventors felt a need of further simplifying the construction, or further improving the capacity to fix the cutting blades to the main body.

SUMMARY OF THE INVENTION

It is therefore a first object of the present invention to provide a cutter head assembly which is further improved in simplification of construction and capacity to fix cutting blade or blades to a main body thereof.

It is a second object of the present invention to provide a cutting blade which is advantageously used in a cutter head assembly.

The above first object may be achieved according to any one of the following modes of the present invention, each of which is numbered like the appended claims and depends from the other mode or modes, where appropriate, to indicate and clarify possible combinations of elements or technical features. It is to be understood that the present invention is not limited to the technical features or any combinations thereof which will be described for illustrative purpose only. It is to be further understood that a plurality of elements or features included in any one of the following modes of the invention are not necessarily provided all together, and that the invention may be embodied without some of the elements or features described with respect to the same mode.

(1) A cutter head assembly for cutting a workpiece, comprising:

a main body which is to be rotated about an axis thereof, and which has at least one cutting-blade receiving bore offset from the axis and extending from an axially distal end face of the main body toward an axially proximal end face of the main body, the main body further having at least one clamping-member receiving bore unparallel to the cutting-blade receiving bore and partially interfering with the cutting-blade receiving bore;

at least one cylindrical cutting blade each received in a corresponding one of the above-described at least one cutting-blade receiving bore and having a flat surface formed as a part of an outer circumferential surface thereof and parallel to an axis of the cutting blade, the cutting blade further having a cutting edge in an axially distal end portion thereof which projects from the axially distal end face of the main body; and at least one cylindrical clamping member each received in a corresponding one of the above-described at least one clamping-member receiving bore and having a fitting portion and a cam portion, the cylindrical clamping member being fitted at the fitting portion in the clamping-member receiving bore, the cam portion having a cam surface whose radial distance from an axis of the fitting portion changes in a circumferential direction of the cylindrical clamping member, wherein the cylindrical clamping member is rotatable about the axis of the fitting portion so that the cam surface is brought into contact with the flat surface of the cutting blade, for thereby pressing the cutting blade onto an inner circumferential surface of the cutting-blade receiving bore.

In the present cutter head assembly, when the cylindrical clamping member is operated to be rotated in a predetermined direction, the cam surface is pressed onto the flat surface of the cylindrical cutting blade, which surface is formed by removing a portion of the cylindrical cutting blade that is located on one of opposite sides of the flat surface remote from the axis. With the pressing contact of the cam surface with the flat surface, the cylindrical cutting blade is held in a predetermined angular position relative to the cutting-blade receiving bore while being pressed onto the inner circumferential surface of the cutting-blade receiving bore, so that cylindrical cutting blade is firmly fixed to the main body. The cylindrical clamping member is more simple in construction in which the fitting portion and the cam portion which are formed integrally with each other, than that of the clamping device of the above-described cutter head assembly disclosed in JP-A-10-58232. The simple construction of the clamping member leads to a simplification in the construction of the entirety of the cutter head assembly, making it possible to manufacture the cutter head assembly in a reduced manufacturing cost. The simple construction of the clamping member also enables the clamping member to be more compact in size, making it possible to increase the number of the cutting blades carried by the single main body of the assembly, without increasing the size of the main body. The increased number of the cutting blades leads to an increase in the amount of stock removed from the workpiece during one rotation of the cutter head assembly, resulting in an improved machining efficiency.

The present cutter head assembly provides another advantage that the cutting blade is prevented from displaced relative to the main body not only in a direction perpendicular to the flat surface of the cutting blade but also in the axial direction of the cutting blade, owing to the arrangement in which the cutting blade is firmly pinched or gripped by and between the clamping member and a portion of the inner circumferential surface of the cutting-blade receiving bore which is substantially opposite to the clamping member.

It should be understood that the direction of the rotation of the clamping member causing the cam surface of the clamping member to be pressed against the flat surface of the cutting blade may be suitably determined depending upon a direction in which a cutting resistance is applied to the cutting blade during a cutting operation. For example, where the cutting resistance as a resultant force includes an axial force component which forces the cutting blade in a direction away from the axially distal end face of the main body toward the axially proximal end face of the main body, it is preferable that the cam surface is brought into pressing contact with the flat surface of the cutting blade by rotating the clamping member in such a direction that causes a contact portion of the cam surface brought into contact with the flat surface, to be moved away from the axially distal end portion of the cutting blade toward the axially proximal end portion of the cutting blade. In this arrangement, when the cutting blade is forced in the direction away from the axially distal end face of the main body toward the axially proximal end face of the main body, a friction force acting between the cam surface and the flat surface is increased, whereby the cam portion of the clamping member is placed in a so-called "self-locking state" for holding the cutting blade against the axial force component of the cutting force.

On the other hand, where the axial force component of the cutting resistance forces the cutting blade in the opposite direction, i.e., in a direction away from the axially proximal end face of the main body toward the axially distal end face of the main body, it is preferable that the cam surface is brought into pressing contact with the flat surface of the cutting blade by rotating the clamping member in such a direction that causes the above-described contact portion of the cam surface to be moved away from the axially proximal end portion of the cutting blade toward the axially distal end portion of the cutting blade.

(2) A cutter head assembly according to mode (1), wherein the cylindrical cutting blade has a cutout formed in the outer circumferential surface such that the cutout extends in a direction parallel to the axis of the cutting blade and is diametrically opposite to the flat surface.

In the assembly according to this mode (2), when the cutting blade is forced by the cam portion of the clamping member in a clamping force direction that is perpendicular to the flat surface of the cutting blade, the cutting blade is brought into contact, at circumferentially opposite edges of the cutout rather than at a single portion of its outer circumferential surface which portion is precisely opposite to the flat surface in the diametric direction (which portion lies on a plane that is perpendicular to the flat surface and that contains the axis of the cutting blade), with the inner circumferential surface of the cutting-blade receiving bore. That is, the cutting blade is held at two portions of the outer circumferential surface which portions are circumferentially spaced apart from the above-described single portion in the circumferential direction, by the inner circumferential surface of the cutting-blade receiving bore. In other words, the cutting blade is held by two tangential planes which consist of respective two portions of the inner circumferential surface of the cutting-blade receiving bore and which are inclined with respect to the above-described clamping force direction, in respective directions opposite to each other. In this arrangement, a wedge effect is provided between the two tangential planes and the two potions of the outer circumferential surface of the cutting blade, whereby the cutting blade is prevented from being displaced relative to the main body not only in a first direction that is perpendicular to the flat surface of the cutting blade but also in a second direction that is parallel to the flat surface and that is perpendicular to the axis of the cutting blade.

In the above-described cutter head assembly disclosed in the Japanese publication in which the cylindrical cutting blade is held only at a single portion of its outer circumferential surface precisely opposite to the flat surface in the diametric direction, by the inner circumferential surface of the cutting-blade receiving bore, there inevitably exists a small gap or clearance between the outer circumferential surface of the cutting blade and the inner circumferential surface of the bore as viewed in the second direction, resulting in an undesirable displacement of the cutting blade in the second direction upon application of a force to the cutting blade in the second direction. This drawback is solved by the cutter head assembly according to this mode (2), as is clear from the above description.

(3) A cutter head assembly according to mode (1), wherein the cylindrical cutting blade has a second flat surface in addition to the flat surface as a first flat surface, the second flat surface being formed as a part of the outer circumferential surface of the cutting blade and parallel to the first flat surface.

The cutter head assembly of this mode (3) can be further easily manufactured while providing the same advantageous effects as the above-described assembly of mode (2). It is preferable that the second flat surface is formed to have such a circumferential width that permits a central angle of the second flat surface to be substantially 90°, for maximizing the advantageous effects provided by the present assembly. In this arrangement, the cutting blade is brought into contact at circumferentially opposite edges of the second flat surface whose central angle is substantially 90° with the inner circumferential surface of the cutting-blade receiving bore. Namely, two pairs of the mutually contacted portions of the outer circumferential surface of the cutting blade and the inner circumferential surface of the bore are inclined with respect to the second flat surface by about 45°, in respective directions opposite to each other, for thereby reliably preventing displacement of the cutting blade in the second direction while avoiding considerable reduction in a rigidity of the cutting blade due to the reduction in the cross sectional area of the cutting blade.

(4) A cutter head assembly according to any one of modes (1)–(3), wherein the fitting portion of the cylindrical clamping member is provided by each of axially opposite end portions of the cylindrical clamping member, while the cam portion of the cylindrical clamping member is provided by an axially intermediate portion of the cylindrical clamping member.

In the assembly of this mode (4), the cylindrical clamping member is held, at its axially opposite end portions each of which provides the fitting portion, by the clamping-member receiving bore. This arrangement assures a sufficiently large rigidity of the clamping member, making it possible to press the cutting blade against the inner circumferential surface of the cutting-blade receiving bore with a large force.

(5) A cutter head assembly according to any one of modes (1)–(4), wherein the cam portion of the cylindrical clamping member consists of an eccentric cam portion which has a circular shape in cross section taken in a plane perpendicular to an axial direction of the cylindrical clamping member and which has an axis offset from the axis of the fitting portion.

In the assembly of this mode (5) in which the cam portion is provided by the eccentric cam portion, the cylindrical clamping member can be further easily produced.

(6) A cutter head assembly according to any one of modes (1)–(5), further comprising a clamping-member-removal preventing device which prevents removal of the cylindrical clamping member from the clamping-member receiving bore.

The removal of the cylindrical clamping member can be prevented by interference or engagement of the clamping member with the cutting blade. However, it is preferable that the clamping-member-removal preventing device is provided between the main body and the clamping member, for thereby preventing contact of the clamping member with a portion of the cutting blade that is other than the (first) flat surface, so as to further improve a reliability in the arrangement in which the cutting blade is fixed to the main body by the clamping member.

(7) A cutter head assembly according to any one of modes (1)–(6), further comprising an angular-displacement limiting device which defines a maximum angle over which the cylindrical clamping member is rotatable relative to the clamping-member receiving bore.

As described above, the direction of the rotation of the clamping member causing the cam surface of the clamping member to be pressed against the flat surface of the cutting blade is preferably predetermined depending upon the direction in which a cutting force is applied to the cutting blade during a cutting operation. In this respect, it is preferable that the angular-displacement limiting device is provided to prevent the cam surface from being pressed against the flat surface by rotation of the clamping member in a direction opposite to the predetermined direction.

(8) A cutter head assembly according to any one of modes (1)–(7), further comprising a limiting member which is fixed to the main body and which has an engaging portion in a distal end portion thereof,
wherein the cylindrical clamping member has an engaging groove which is formed in an outer circumferential surface of the fitting portion and which extends over a predetermined distance in a circumferential direction of the cylindrical clamping member, and wherein the limiting member is engaged at the engaging portion with the engaging groove.

In the assembly of this mode (8), the clamping-member-removal preventing device and the angular-displacement limiting device are provided by the cooperation of the limiting member and the engaging groove which are simple in constructions.

(9) A cutter head assembly according to any one of modes (1)–(8), wherein the cutting edge is defined by an intersection of a rake face and a flank face which are formed in the cylindrical cutting blade, and wherein the rake face is parallel with the axis of the cylindrical cutting blade.

In the assembly of this mode (9) in which the rake face is formed to be parallel with the axis of the cutting blade, a resharpening operation is easily carried out when the cutting edge of the cutting blade becomes dull. Namely, an original sharpness of the cutting edge is easily restored by regrinding only the flank face. Further, the rake face parallel with the axis of the cutting blade can be coated with a coating layer which is formed of titanium nitride, titanium carbide or other material in an electrodeposition process.

(10) A cutter head assembly according to mode (9), wherein the flat surface has an entire width as measured in a width direction perpendicular to the axis of the cylindrical cutting blade, and a recessed portion formed therein and elongated in a direction parallel to the axis of the cylindrical cutting blade, the recessed portion having a width as measured in the width direction, which width is smaller than the entire width, the rake face being provided by the recessed portion.

In the above-described cutter head assembly disclosed in the Japanese publication, when the rake face is modified for some reasons, the wedge member also has to be modified in accordance with the modification of the rake face which is provided by the flat surface of the cutting blade brought into engagement with the positioning surface of the wedge member. In the assembly of this mode (10) in which the rake face is provided by the recessed portion recessed toward the axis of the cylindrical cutting blade, the rake face can be modified as needed without having to modify the clamping member. Further, in the cutter head assembly disclosed in the Japanese publication, if the entirety of the rake face is coated with a coating layer, the positioning surface brought into engagement with the coated rake face is likely to be easily worn due to a high degree of hardness of the coated rake surface, possibly resulting in a reduced service life of the wedge member. In the assembly of this mode (10) in which the clamping member and the rake face does not interfere with each other, it is possible to avoid reduction in the service life of the clamping member even if the entirety of the rake surface is coated with a coating layer.

(11) A cutter head assembly according to mode (10), wherein the recessed portion is formed in a widthwise intermediate portion of the flat surface.

In the assembly of this mode (11), the cam surface of the cam portion of the clamping member is brought into close contact with widthwise opposite end portions of the flat surface which are located on respective widthwise opposite sides of the rake faces, for thereby making it possible to position the cylindrical cutting blade in a predetermined angular position relative to the cutting-blade receiving bore with higher accuracy and stability.

(12) A cutter head assembly according to any one of modes (9)–(11), wherein the rake face consists of a single surface.

In the assembly of this mode (12), the rake face is easily formed. It is noted that the rake face may consist of a flat surface or a curved surface which extends in parallel with the axis of the cylindrical cutting blade. The curved rake face makes it possible to form opposite side faces of a tooth slot of a gear with the single cutting blade, for example, in a hobbing operation.

(13) A cutter head assembly according to any one of modes (9)–(11), wherein the rake surface consists of a plurality of surfaces which intersect with each other.

In the assembly of this mode (13), the plurality of surfaces may include a first rake face which serves to actually cut the workpiece, and a second rake face which is unparallel and intersects with the first rake face. The second rake face may be parallel to the (first) flat surface, for improving an rigidity of the cutting blade and/or an efficiency of removal of cutting chips produced in a cutting operation.

(14) A cutter head assembly according to any one of modes (1)–(13), wherein the at least one clamping-member receiving bore includes a plurality of bores which interfere with respective portions of each of the at least one cutting-blade receiving bore, and wherein the respective portions are spaced apart from each other in an axial direction of the each of the at least one cutting-blade receiving bore.

In the assembly of this mode (14), the cutting blade is fixed to the main body more firmly and reliably than where the single clamping-member receiving bore is provided for each of the cutting-blade receiving bores.

(15) A cutter head assembly according to any one of modes (1)–(14), wherein the main body consists of a disk-shaped body whose center line lies on the axis about which the main body is to be rotated;

wherein the at least one cutting-blade receiving bore consists of a plurality of bores which are arranged in a circumferential direction of the disk-shaped body;

and wherein the at least one cylindrical cutting blade consists of a plurality of cutting blades which are respectively received in the plurality of bores.

(16) A cutter head assembly according to mode (15), wherein the plurality of bores are located on at least one circle whose center lies on the axis of the main body.

The assembly of this mode (16) is advantageously used as a face milling or hobbing cutter for cutting a bevel gear having curved teeth in accordance with a generating method or a forming method. The plurality of cutting blades commonly consist of a plurality of inside cutting blades and a plurality of outside cutting blades which are received in the respective cutting-blade receiving bores. Each of the inside cutting blades cuts the workpiece by a radially inner portion of its cutting edge which portion is closer to the axis of the main body than a radially outer portion of its cutting edge. Each of the outside cutting blades cuts the workpiece by a radially outer portion of its cutting edge which portion is more distant from the axis of the main body than a radially inner portion of its cutting edge. Where the above-described at least one circle consists of a single circle, namely, where the inside and outside cutting blades are received in the respective bores which are located on the single circle, the inside and outside cutting blades are formed to be different from each other in the arrangement of the cutting edge, such that the radially inner portion of the cutting edge of each inside cutting blade is positioned inwardly of the radially inner portion of the cutting edge of each outside cutting blade as viewed in the radial direction of the main body, and such that the radially outer portion of the cutting edge of each outside cutting blade is positioned outwardly of the radially outer portion of the cutting edge of each inside cutting blade as viewed in the radial direction of the main body. On the other hand, where the above-described at least one circle consists of a plurality of circles, e.g., a large circle having a comparatively large diameter and a small circle having a comparatively small diameter, the outside cutting blades are received in the holes located on the large circle while the inside cutting blades are received in the holes located on the small circle. In the latter case, the inside and outside cutting blades may be identical with each other in the arrangement of the cutting edge.

(17) A cutter head assembly according to mode (15) or (16), wherein the plurality of cutting blades consist of at least one pair of inside and outside cutting blades which are adjacent to each other in the circumferential direction, and wherein the cutting edges of the at least one pair of inside and outside cutting blades are arranged along at an involute of a base circle whose center lies on the axis of the main body.

The assembly of this mode (17) is advantageously used as a face hobbing cutter for machining or cutting a bevel gear having curved teeth in accordance with a generating method or a forming method. The cutting edges of all the cutting blades may be arranged along a single involute or a plurality of involutes of the base line whose center lies on the axis of the main body. Where the cutting edges of the cutting blades are arranged along the plurality of involutes, it is preferable that the cutting edges of each of the above-described at least one pair of inside and outside cutting blades are located in the same involute. As in the above-described assembly of mode (16), the plurality of bores for receiving therein the respective cutting blades may be located on a single circle, or alternatively on a plurality of circles having respective diameters different from each other.

(18) A cutter head assembly according to any one of modes (15)–(17), wherein the plurality of cutting blades includes an inside cutting blade and an outside cutting blade, the inside cutting blade cutting the workpiece by a portion of the cutting edge which portion is closer to the axis of the main body than the other portion of the cutting edge, the outside cutting blade cutting the workpiece by a portion of the cutting edge which portion is more distant from the axis of the main body than the other portion of the cutting edge.

The assembly of this mode (18) is advantageously used as a gear cutter for machining or cutting a bevel gear having curved teeth, wherein opposite side faces of a tooth slot of the bevel gear are satisfactorily formed by the inside and outside cutting blades, respectively.

(19) A cylindrical cutting blade having a first flat surface and a second flat surface formed as respective parts of an outer circumferential surface thereof and parallel to an axis of the cutting blade, the cutting blade further having, in one of axially opposite end portions thereof, a cutting edge defined by an intersection of a rake face and a flank face which are formed in the cutting blade.

The above-described second object may be achieved according to this mode (19). In the cylindrical cutting blade of this mode (19), the first and second flat surfaces may be formed to be parallel to each other or unparallel to each other. However, it is preferable that the second flat surface intersects with a plane that is perpendicular to the first flat surface and that contains the axis of the cutting blade. The present cylindrical cutting blade may include any one or any combinations of the features recited in modes (9)–(13).

(20) A cutter head assembly comprising:
  a main body which has at least one cutting-blade receiving bore and at least one clamping-member receiving bore unparallel to the cutting-blade receiving bore and partially interfering with the cutting-blade receiving bore;
  at least one cylindrical cutting blade each received in a corresponding one of the above-described at least one cutting-blade receiving bore, the cutting blade having two flat surfaces formed as respective parts of an outer circumferential surface thereof and having respective widths as measured in a direction parallel to a radial direction of the cutting blade, the two flat surfaces being parallel to each other and parallel to an axis of the cutting blade, the cutting blade further having a cutting edge in an axially distal end portion thereof which projects from an end face of the main body, the cutting edge being defined by an intersection of a flank face which is formed in the axially distal end portion, and a rake face which is formed in a widthwise intermediate portion of one of the two surfaces and which is parallel to the axis of the cutting blade; and
  at least one cylindrical clamping member each received in a corresponding one of the above-described at least one clamping-member receiving bore and having a fitting portion and a cam portion, the cylindrical clamping member being rotatably fitted at the fitting portion in the clamping-member receiving bore, the cam portion having a cam surface whose radial distance from an axis of the fitting portion changes in a circumferential direction of the cylindrical clamping member.

The assembly of this mode (20) is advantageously used as a face milling or hobbing cutter for cutting a bevel gear having curved teeth, or alternatively as any other cutting tool for, for example, boring a bore, machining a flat surface and machining an outer circumferential surface. The present assembly may include any one or any combinations of the features recited in modes (4)–(8) and (12)–(14).

(21) A cutter head assembly comprising:
  a main body which is to be rotated about an axis thereof and which has at least one cutting-blade receiving bore receiving therein a cutting blade, the cutting-blade receiving bore being offset from the axis and extending from an axially distal end face of the main body toward an axially proximal end face of the main body, the main body further having at least one clamping-member receiving bore unparallel to the cutting-blade receiving bore and partially interfering with the cutting-blade receiving bore; and
  at least one cylindrical clamping member each received in a corresponding one of the above-described at least one clamping-member receiving bore and having a fitting portion and a cam portion, the cylindrical clamping member being fitted at the fitting portion in the clamping-member receiving bore, the cam portion having a cam surface whose radial distance from an axis of the fitting portion changes in a circumferential direction of the cylindrical clamping member,
  wherein the cylindrical clamping member is rotatable about the axis of the fitting portion so that the cam surface is brought into contact with an outer circumferential surface of the cutting blade which is received in the cutting-blade receiving bore, for thereby pressing the cutting blade onto an inner circumferential surface of the cutting-blade receiving bore.

The cutting blade used for the assembly of this mode (21) may have any desired shape as long as the cutting blade is fittable into the cutting-blade receiving bore. The present assembly may include any one or any combinations of the features recited in modes (4)–(8) and (14)–(16).

BRIEF DESCRIPTION OF THE DRAWINGS

The above and other objects, features, advantages and technical and industrial significance of the present invention will be better understood by reading the following detailed description of presently preferred embodiments of the invention, when considered in connection with the accompanying drawings, in which.

DETAILED DESCRIPTION OF THE PREFERRED EMBODIMENTS

Figure 1:
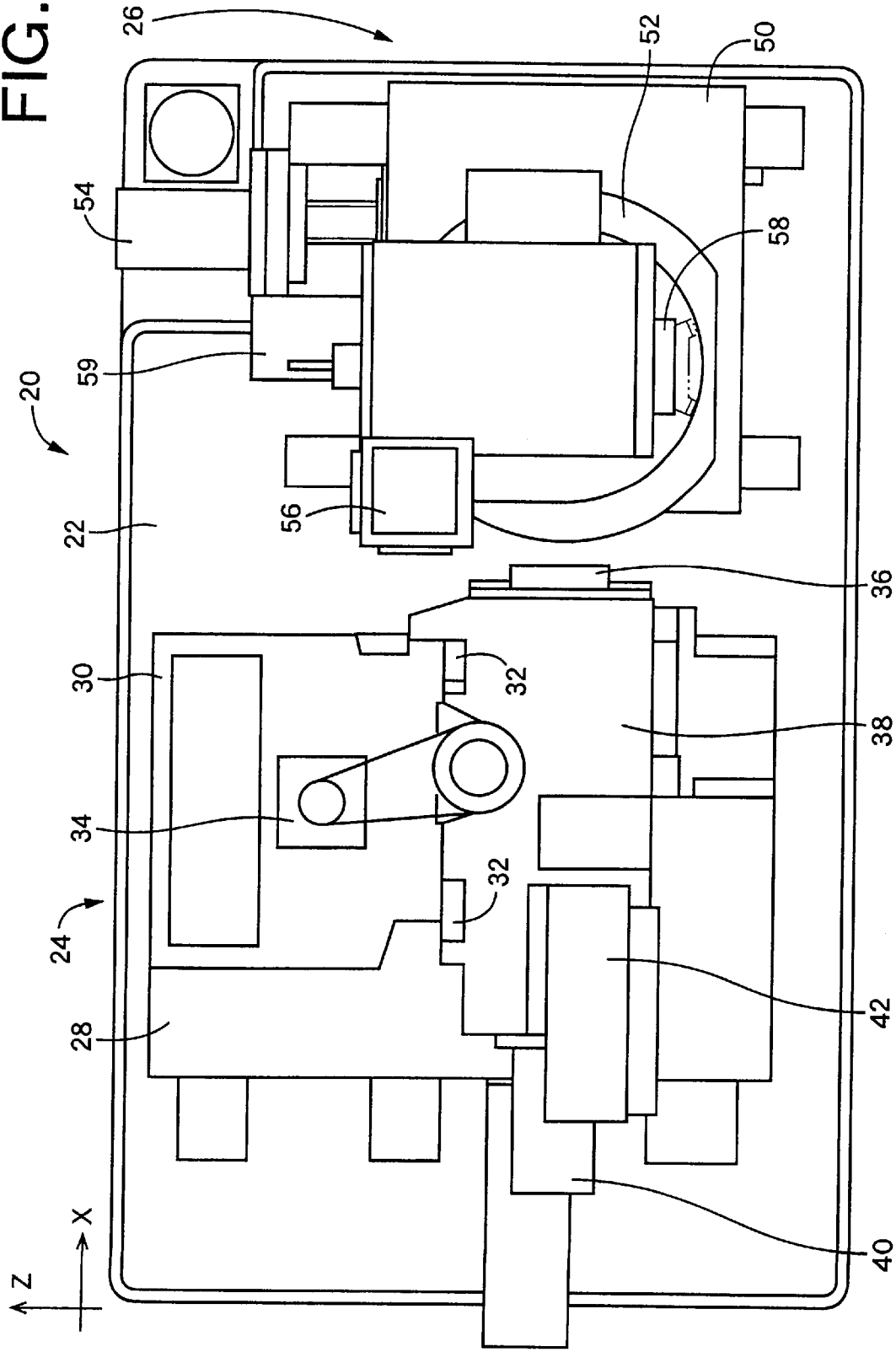
FIG. 1 is a plan view of a gear forming machine in which a face milling cutter constructed according to one embodiment of the invention is mounted.

Referring first to FIGS. 1–10, there will be described a cutter head assembly in the form of a face milling cutter 10 constructed according to one embodiment of this invention. The face milling cutter 10 is used to be mounted in a gear forming machine 20 as shown in FIG. 1, for forming a spiral bevel gear, a hypoid gear or other bevel gear having curved teeth. This face milling cutter 20, which is well known in the art, will be briefly described by reference to the plan view of FIG. 1.

The machine 20 includes a tool support 24 and a work support 26 which are held by a machine base 22 such that the two supports 24, 26 are movable relative to each other.

The tool support 24 includes a first carriage 28 which is movable in a first direction (hereinafter referred to as "X-axis direction") that is parallel to a horizontal surface of the machine base 22. The first carriage 28 carries a column 30 which is mounted on the first carriage 28. The column 30 has a side surface to which guide ways 32 are attached to extend in the vertical direction (hereinafter referred to as "Y-axis direction"). A tool head 38 is mounted on the guide ways 32, and is driven by a Y-axis motor 34 so as to be movable along the guide ways 32 in the Y-axis direction. A tool spindle 36 is supported by the tool head 38 such that the tool spindle 36 is rotatable about its axis and is movable relative to the tool head 38 in the axial direction (corresponding to the X-axis direction). A tool spindle motor 40 and an axial movement motor 42 are provided in the tool head 38, for rotating the tool spindle 36 and moving the tool spindle 36 in the axial direction, respectively. The Y-axis motor 34, the tool spindle motor 40 and the axial movement motor 42 are controlled by a control device (not shown), for rotating the tool spindle 36 about its axis while moving the tool spindle 36 in the X-axis and Y-axis directions.

The work support 26 includes a second carriage 50 which is movable in a second direction (hereinafter referred to as "Z-axis direction") that is parallel to the horizontal surface of the machine base 22 and that is perpendicular to the X-axis direction. The second carriage 50 carries a rotary table 52 which is mounted on the second carriage 50. The rotary table 52 is rotatable about its axis parallel to the vertical direction, relative to the second carriage 50. The movement of the second carriage 50 in the Z-axis direction and the rotational movement of the rotary table 52 are effected by a Z-axis motor 54 and a rotational movement motor 56 which are provided in the machine base 22 and the rotary table 52, respectively. A work spindle 58 is supported by the rotary table 52 such that the work spindle 58 is rotatable, by a work spindle motor 59, about its axis that is parallel to the rotary table 52. In this arrangement, the work spindle 58 is rotatable about the horizontal axis, movable in the Z-axis direction, and rotatable or pivotable about the vertical axis.

As is clear from the above descriptions, the gear forming machine 20 is capable of performing a gear cutting operation in accordance with either one of the "forming (non-generating) method" and the "generating method", by combining the above-described three linear movements in the X-axis, Y-axis and Z-axis directions and also the rotational movements about their respective axes which are parallel to the X-axis direction, Y-axis direction and the horizontal surface.

Figure 2:
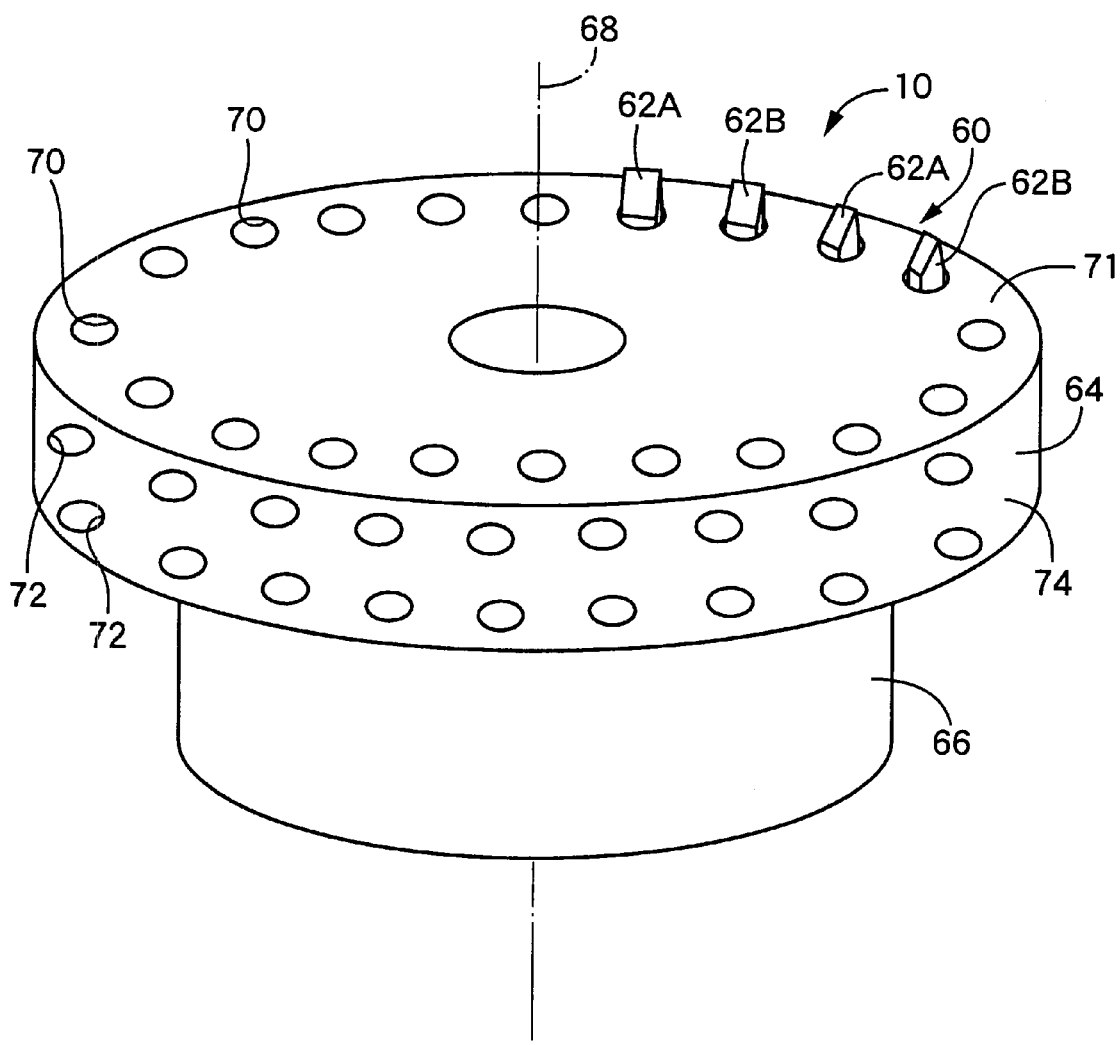
FIG. 2 is a perspective view of the face milling cutter of the one embodiment of the invention.

The face milling cutter 10 is designed to carry a plurality of cylindrical cutting blades 62 attached to its main body 60, as shown in FIG. 2 in which some of the cutting blades 62 are not shown. The main body 60 consists of a generally stepped cylindrical member including a large diameter portion and a small diameter portion which serve as a cutting-blade holder portion 64 and a shank portion 66, respectively. The main body 60 can be coaxially attached at the shank portion 66 to the tool spindle 36, such that the main body 60 and the tool spindle 36 are not rotatable relative to each other. The cutting-blade holder portion 64 has a plurality of cutting-blade receiving bores 70 each of which has a circular cross sectional shape and is formed through the cutting-blade holder portion 64 in the axial direction. The cutting-blade receiving bores 70 are arranged on a circle whose center lies on an axis 68 about which the main body 60 is to be rotated.

Figure 3:
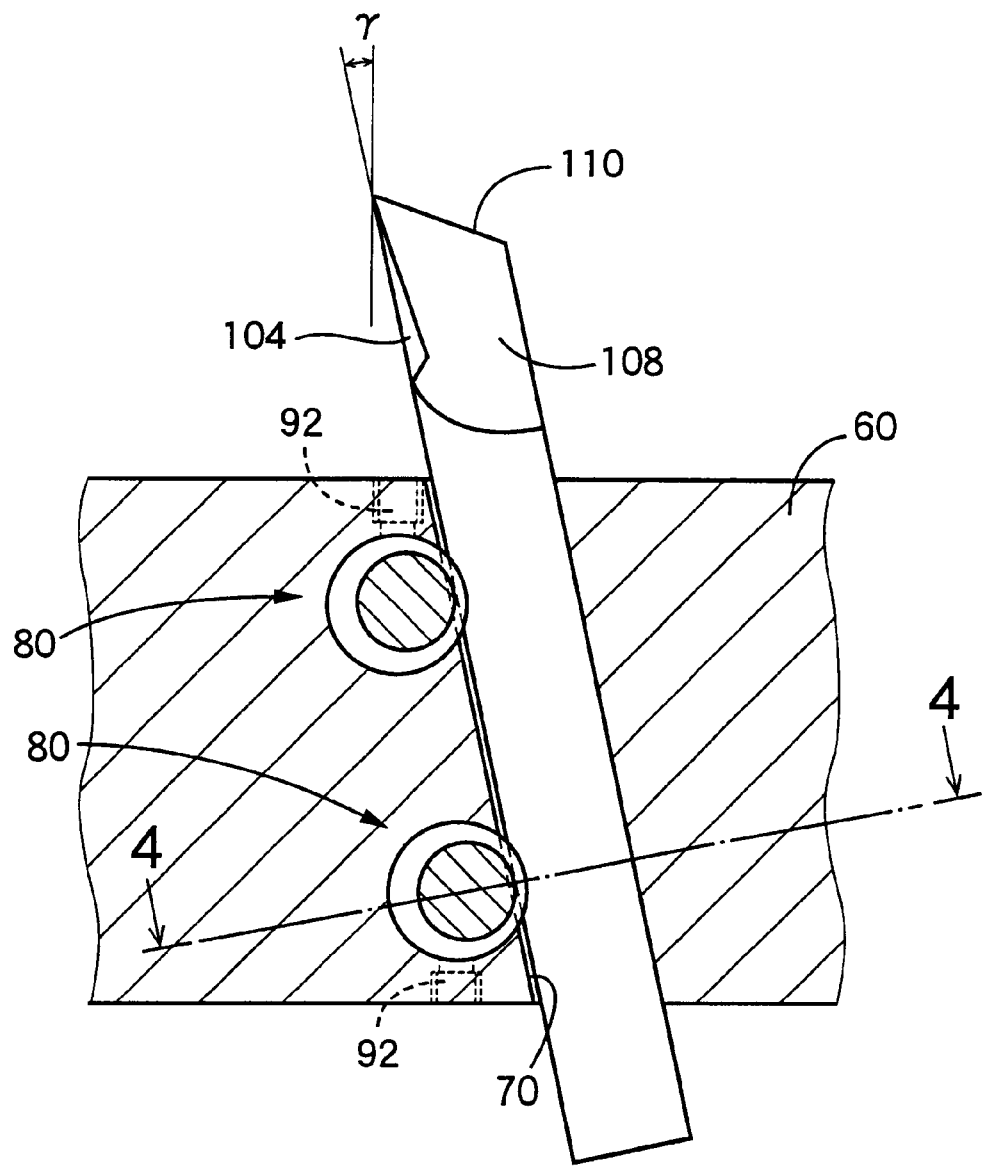
FIG. 3 is a side view of a cylindrical cutting blade attached to the face milling cutter of FIG. 2.

As best shown in FIG. 3, each cutting-blade receiving bore 70 extends in a direction inclined with respect to the axial direction of the main body 60. Described specifically, the cutting-blade receiving bore 70 is forwardly inclined on a tangential plane which is tangent to a cylindrical surface whose center lies on the axis 68, by a predetermined angle γ which preferably ranges from 1°–12°. Each cutting blade 62 is received in the corresponding the cutting-blade receiving bore 70 in such a manner that an axially distal end portion of the cutting blade 62 projects from an axially distal end face 71 of the main body 60. Owing to the forward inclination of the cutting-blade receiving bore 70, an opening of the bore 70 in the axially distal end face 71 is positioned forwardly of an opening of the bore in an axially proximal end face of the main body 60, as viewed in a direction in which the main body 60 is operated to be rotated.

The cutting-blade holder portion 64 further has a plurality of clamping-member receiving bores 72 such that the two clamping-member receiving bores 72 are provided for each cutting-blade receiving bore 70. The two clamping-member receiving bores 72 are unparallel to the corresponding cutting-blade receiving bore 70, and partially interfere with respective two portions of the corresponding cutting-blade receiving bore 70 which are spaced apart from each other in the axial direction of the cutting-blade receiving bore 70. More specifically, although the axes of the respective two clamping-member receiving bores 72 do not intersect the axis of the cutting-blade receiving bore 70, the shortest distance between the axis of each of the clamping-member receiving bores 72 and the axis of the cutting-blade receiving bore 70 is smaller than the sum of radii of the respective bores 70, 72, so that the two clamping-member receiving bores 72 partially interfere with the respective two portions of the cutting-blade receiving bore 70, as shown in FIG. 3. In the present embodiment, each of the clamping-member receiving bores 72 extends radially inwardly from an outer circumferential surface 74 of the cutting-blade holder portion 64 in a direction that is perpendicular to the corresponding cutting-blade receiving bore 70 and that is perpendicular to a tangential plane that is tangent, at the opening of the bore 72, to the outer circumferential surface of the main body 60.

Figure 4:
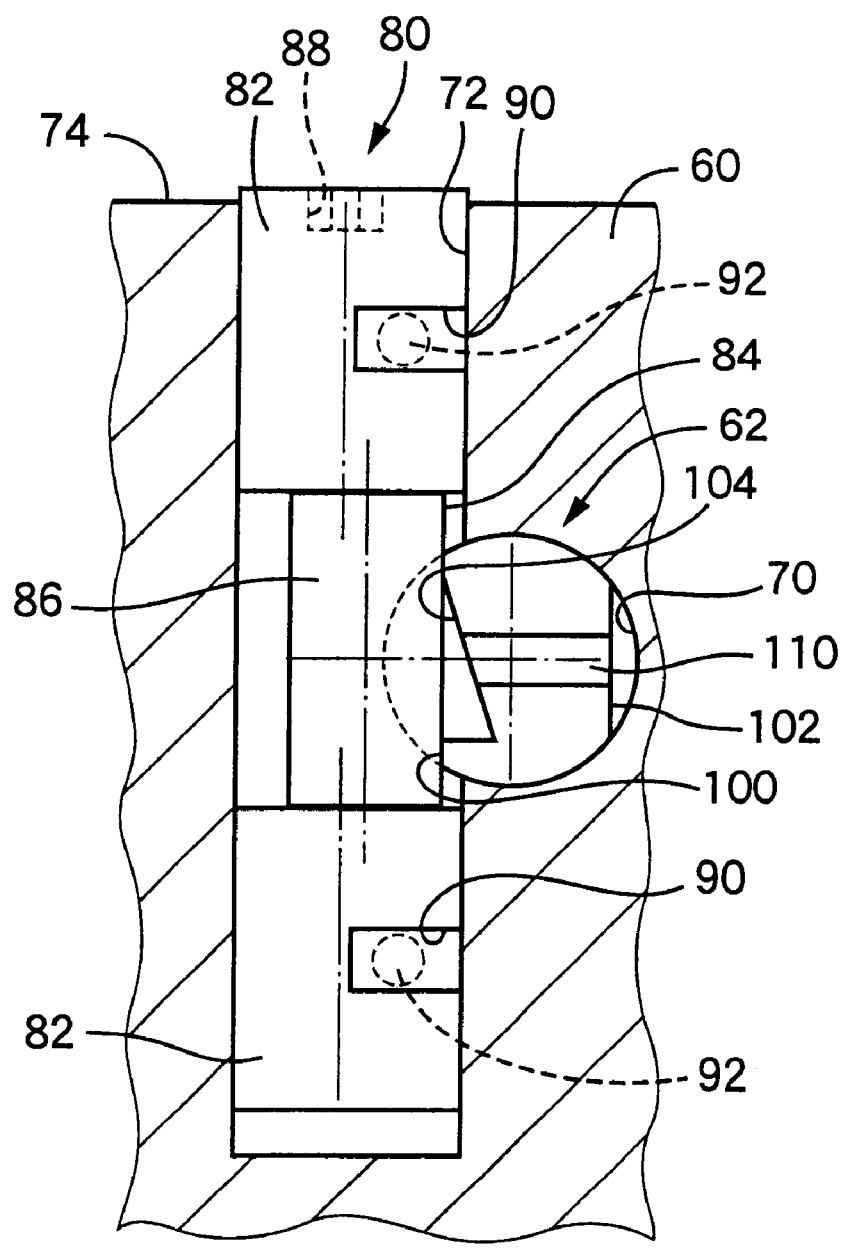
FIG. 4 is a cross sectional view taken along line 4—4 of FIG. 3.
Figure 5:
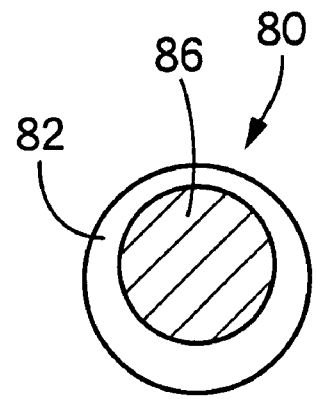
FIG. 5 is a cross sectional view of a cylindrical clamping member which is shown in FIG. 4.
Figure 6:
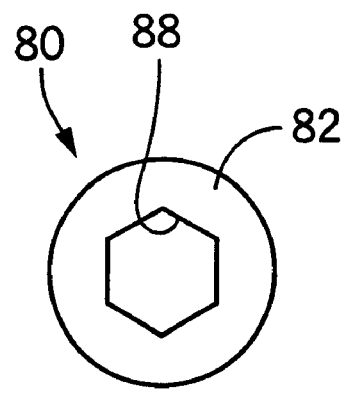
FIG. 6 is a side view of the cylindrical clamping member which is shown in FIG. 4.

A cylindrical clamping member 80 is provided to be received in each of clamping-member receiving bores 72 such that the clamping member 80 is rotatable relative to the bore 72. As the shown in FIGS. 4–6, the clamping member 80 has, in its respective axially opposite end portions, fitting portions 82 each rotatably fitted in the clamping-member receiving bores 72 and having an axis about which the clamping member 80 is rotatable. The clamping member 80 has, in its axially intermediate portion, an eccentric cam portion 86 which has an axis offset from the axis of each fitting portion 82 and a cam surface 84 brought into contact with the cutting blade 62. The eccentric cam portion 86 has a circular cross sectional shape, and does not protrude radially outwardly of the fitting portions 82, as shown in FIG. 5. Each fitting portion 82 and the eccentric cam portion 86 are formed integrally with each other and accordingly are not rotatable relative to each other. The clamping member 80 is operable to be rotated relative to the clamping-member receiving bores 72, by using a suitable tool engaging an hexagonal socket 88 which is formed in an axial end face of one of the fitting portions 82, as shown in FIG. 6. As a result of the rotation of the clamping member 80, the eccentric cam portion 86 is displaced toward and away from the cutting-blade receiving bore 70, for thereby selectively establishing a clamping state and an unclamping state. The clamping member 80 cooperates with the cutting-blade receiving bore 70 to inhibit displacement of the cutting blade 62 relative to the cutting-blade receiving bore 70 in the clamping state, and to allow displacement of the cutting blade 62 relative to the cutting-blade receiving bore 70 in the unclamping state.

The cylindrical clamping member 80 has an engaging groove 90 formed in the outer circumferential surface of each fitting portion 82 and extending over a predetermined circumferential distance in the circumferential direction. This engaging groove 90 is brought into engagement with a limiting member in the form of an engaging protrusion 92 which is provided to protrude from the inner circumferential surface of the clamping-member receiving bore 72, for thereby defining a maximum angle over which the cylindrical clamping member 80 is rotatable relative to the clamping-member receiving bore 72 and preventing removal of the clamping member 80 from the clamping-member receiving bore 72. The engaging protrusion 92 may consist of a press-fitting pin fixed to the cutting-blade holder portion 64, or alternatively a screw bolt having an externally threaded portion brought into engagement with each of internally threaded holes which are formed to extend in a direction perpendicular to the clamping-member receiving bore 72 from the axially distal end face 71 and the axially proximal end face of the cutting-blade holder portion 64, respectively. In the present embodiment, the cylindrical clamping member 80 is adapted to be rotatable between a first angular position in which the shortest distance from the cam surface 84 to the axis of the cutting-blade receiving bore 70 is minimized, and a second angular position in which the clamping member 80 is rotated or angularly displaced from the first angular position in the counter-clockwise direction (as seen FIG. 3) over a predetermined angle which may be, for example, 90°, 120° or 180°. The engaging groove 90 and the engaging protrusion 92 cooperate with each other to constitute the clamping-member-removal preventing device and the angular-displacement limiting device which are described above in the SUMMARY OF THE INVENTION.

The cylindrical cutting blades 62 are received in the respective cutting-blade receiving bores 70 in such a manner that the axially distal end portions of the respective cutting blades 62 project from the axially distal end face 71 of the main body 60. In the present embodiment, the cutting blades 62 consist of inside cutting blades 62A and outside cutting blades 62B which are alternately arranged in the circumferential direction. Each of the inside cutting blades 62A cuts the workpiece mainly by a radially inner portion of its cutting edge which portion is closer to the axis 68 of the main body 60 than a radially outer portion of its cutting edge. Each of the outside cutting blades 62B cuts the workpiece mainly by a radially outer portion of its cutting edge which portion is more distant from the axis 68 of the main body 60 than a radially inner portion of its cutting edge. In a gear cutting operation for cutting a bevel gear having curved teeth, the inside cutting blade 62A serves to form the inside or convex face of each tooth slot, while the outside cutting blade 62B serves to form the outside or concave face of each tooth slot. It is noted that the above-described cutting edge of each cutting blade 62A, 62B may be interpreted to include cutting edges 112, 114, 116 which will be described below.

Figure 7:
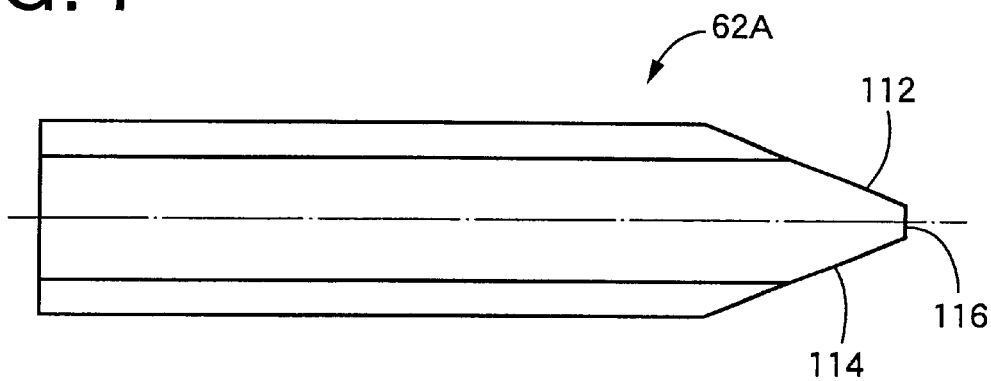
FIG. 7 is a front view of the cylindrical cutting blade.
Figure 8:
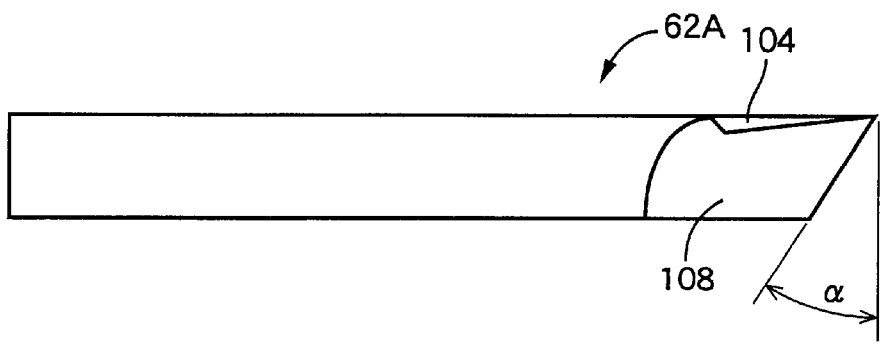
FIG. 8 is a side view of the cylindrical cutting blade.
Figure 9:
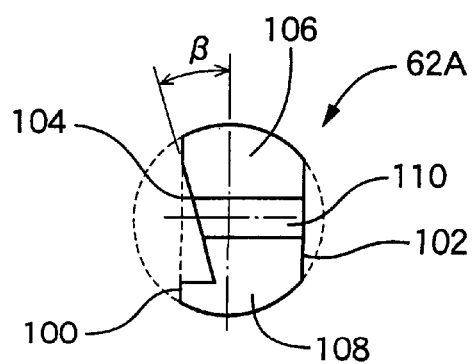
FIG. 9 is a plan view of the cylindrical cutting blade.

The inside cutting blade 62A illustrated in FIGS. 7–9 consists of a cylindrical member having a generally circular cross sectional shape, and has a first flat surface 100 and a second flat surface 102 formed in its outer circumferential surface by removing a portion which is located on the side of each of the flat surfaces 100, 102 remote from the axis of the cutting blade 62A. The first and second flat surfaces 100, 102 are parallel with each other, and extend in parallel with the axis of the inside cutting blade 62A. As shown in FIG. 4, the inside cutting blade 62A is fitted in the cutting-blade receiving bore 70 such that the first flat surface 100 is opposed to the cam surface 84 of the clamping member 80 and such that the second flat surface 102 is opposed to a portion of the inner circumferential surface of the cutting-blade receiving bore 70 which portion is positioned on the rear side of the second flat surface 102 as viewed in the rotation direction of the main body 60. The second flat surface 102 has a central angle of about 90°, so that two tangential planes, which are tangent to the outer circumferential surface of the inside cutting blade 62A at respective widthwise opposite edges of the second flat surface 102, are inclined with respect to a direction perpendicular to the flat surfaces 100, 102 by about 45°, in respective directions opposite to each other. Owing to this arrangement, the inside cutting blade 62A supported by the inner circumferential surface of the cutting-blade receiving bore 70 is effectively is prevented from being displaced relative to the main body 60 not only in a first direction that is substantially parallel to the tangential direction of the main body 60 but also in a second direction that is substantially parallel to the radial direction of the main body 60. In other words, a tangential force component and a radial force component of the cutting resistance acting on the cutting blade 62A are effectively received by the inner circumferential surface of the cutting-blade receiving bore 70.

The first flat surface 100 has a central angle larger than that of the second flat surface 102, so that the first flat surface 100 has a width larger than that of the second flat surface 102. A rake face 104 is formed in an intermediate portion of the first flat surface 100 as viewed in a width direction of the rake face 104 that is perpendicular to the axis of the cylindrical cutting blade 62A. In other words, the first flat surface 100 has the widthwise intermediate portion which is recessed toward the axis of the cutting blade 62A and which provides the rake face 104. The rake face 104 extends in parallel with the axis of the inside cutting blade 62A, and is coated with a coating layer which is formed of titanium nitride, titanium carbide or other material in an electrodeposition process. The coating layer may be formed to cover the entirety of the rake face 104. However, it is preferable that the coating layer covers exclusively a portion of the rake face 104 in which portion a cutting edge can be formed in a sharpening or resharpening operation.

The rake face 104 consists of a single flat surface which is inclined with respect to the first flat surface 100 such that the distance from the first flat surface 100 to the rake face 104 increases as viewed in a radial direction away from the axis of the main body 60 toward the outer circumferential surface of the main body 60. The angle of the inclination of the rake face 104 with respect to the first flat surface 100 may be freely determined as long as the rake face 104 does not interfere with the cam surface 84, namely, as long as the shortest radial distance of the rake face 104 from the axis of the cutting blade 62A is smaller than the shortest radial distance of the first flat surface 100 from the axis of the cutting blade 62A. In this arrangement, the cam surface 84 can be brought into contact with widthwise opposite end portions of the first flat surface 100 which are located on respective widthwise opposite sides of the rake face 104. Further, the common clamping member 80 can be used for clamping the cutting blade 62A, irrespective of the amount of the inclination angle of the rake face 104.

The inside cutting blade 62A has two flank faces 106, 108 and a top land 110 formed in its axially distal end portion. Three cutting edges 112, 114, 116 are defined by an intersection of the rake face 104 and the flank face 106, an intersection of the rake face 104 and the flank face 108, and an intersection of the rake face 104 and the top land 110, respectively. The top land 110 is provided by the axially distal end face of the cutting blade 62A, and the two flank faces 106, 108 are located on the respective opposite sides of the top land 110. The flank faces 106, 108 are inclined in respective directions opposite to each other such that the distance between the two flank faces 106, 108 increases as the two flank faces 106, 108 extend away from the top land 110. The top land 110 has a relief angle α as shown in FIG. 8, and the flank faces 106, 108 also have respective relief angles (not shown), so that the flank faces 106, 108 and the top land 110 are located inwardly of respective trajectories described by the cutting edges 112, 114, 116 when the face milling cutter 10 is rotated. The cutting edge 112 has a positive rake angle β which corresponds to the above-described angle of the inclination of the rake face 104 with respect to the first flat surface 100, as shown in FIG. 9. The cutting edge 116 has a positive rake angle γ which corresponds to the above-described angle of the forward inclination of the cutting-blade receiving bore 70, as shown in FIG. 3. In contrast with the cutting edges 112, 116, the cutting edge 114 has a negative rake angle. The negative rake angle of the cutting edge 114 does not lead to deterioration in the cutting performance of the cutting blade 62A. This is because the cutting edge 114 is brought into engagement, merely at a portion thereof contiguous to the cutting edge 116, with the workpiece in a cutting operation. That is, the cutting operation is effected mainly by the cutting edges 112, 116. It is noted that the rake angle of cutting edge 116 does not have to be necessarily positive, either, but may be negative as the that of the cutting edge 114.

The outside cutting blade 62B is substantially identical in construction with the inside cutting blade 62A, except that the rake face of the outside cutting blade 62B is inclined in a direction opposite to the direction in which the rake face 104 of the inside cutting blade 62A is inclined, and that the outside cutting blade 62B cuts the workpiece mainly by the radially outer portion of its cutting edge. The outside cutting blade 62B is positioned relative to the inside cutting blade 62A such that the center of the top land (as viewed in the width direction of the top land) of the outside cutting blade 62B is slightly offset from the center of the top land of the inside cutting blade 62A outwardly in the radial direction of the main body 60, whereby the bottom of each tooth slot is formed by the cooperation of the inside and outside cutting blades 62A and 62B.

There will be described an operation for attaching the inside and outside cutting blades 62A, 62B to the main body 60. In the following description, the inside and outside cutting blades 62A, 62B are not distinguished from each other and are commonly referred to as the cutting blades 62, since there is no substantial difference between the respective operations for attaching the inside and outside cutting blades 62A, 62B to the main body 60.

Firstly, the cylindrical clamping member 80 is rotated in the counter-clockwise direction (as viewed in FIG. 3) until the engaging protrusion 92 is brought into abutting contact with one of the circumferentially opposite ends of the engaging groove 90, so as to be placed in the unclamping state. In this state, the cutting blade 62 is introduced into the cutting-blade receiving bore 70, and is adjusted to be positioned in a predetermined axial position relative to the bore 70 which position permits the cutting blade 62 to project from the axially distal end face 71 of the main body 60 over a predetermined axial distance. After the adjustment of the axial position of the cutting blade 62, the cylindrical clamping member 80 is rotated in the clockwise direction (as viewed in FIG. 3) until the cam surface 84 of the clamping member 80 is brought into pressing contact at its contact portion with the first flat surface 100 of the cutting blade 62, for pressing the cutting blade 62 onto a portion of the inner circumferential surface which portion is opposite to the cam surface 84, whereby the cutting blade 62 is fixed to the main body 60. As a result of the clockwise rotation of the cylindrical clamping member 80, the contact portion of the cam surface 84 is pressed onto the first flat surface 100 of the cutting blade 62 while at the same time being moved in a direction away from the axially distal end portion of the cutting blade 62 toward the axially proximal end portion of the cutting blade 62. In this instance, the cutting blade 62 is forced in the backward direction, i.e., in a direction toward the axially proximal end face of the cutting-blade holder portion 64 away from the axially distal end face 71, by the rotated cylindrical clamping member 80 due to a friction force acting between the cam surface 84 and the first flat surface 100. Thus, it is preferable to prevent backward displacement of the cutting blade 62 while rotating the clamping member 80.

As described above, the cylindrical clamping member 80 is adapted to be rotatable between the first angular position in which the shortest distance from the cam surface 84 to the axis of the cutting-blade receiving bore 70 is minimized, and the second angular position in which the clamping member 80 is rotated or angularly displaced from the first angular position in the counter-clockwise direction (as seen FIG. 3) over a predetermined angle which may be, for example, 90°, 120° or 180°. This arrangement permits the cutting blade 62 to be fixed to the main body 60 by the clockwise rotation of the clamping member 80, while preventing the cutting blade 62 from being fixed to the main body 60 by the counter-clockwise rotation of the clamping member 80.

Figure 10:
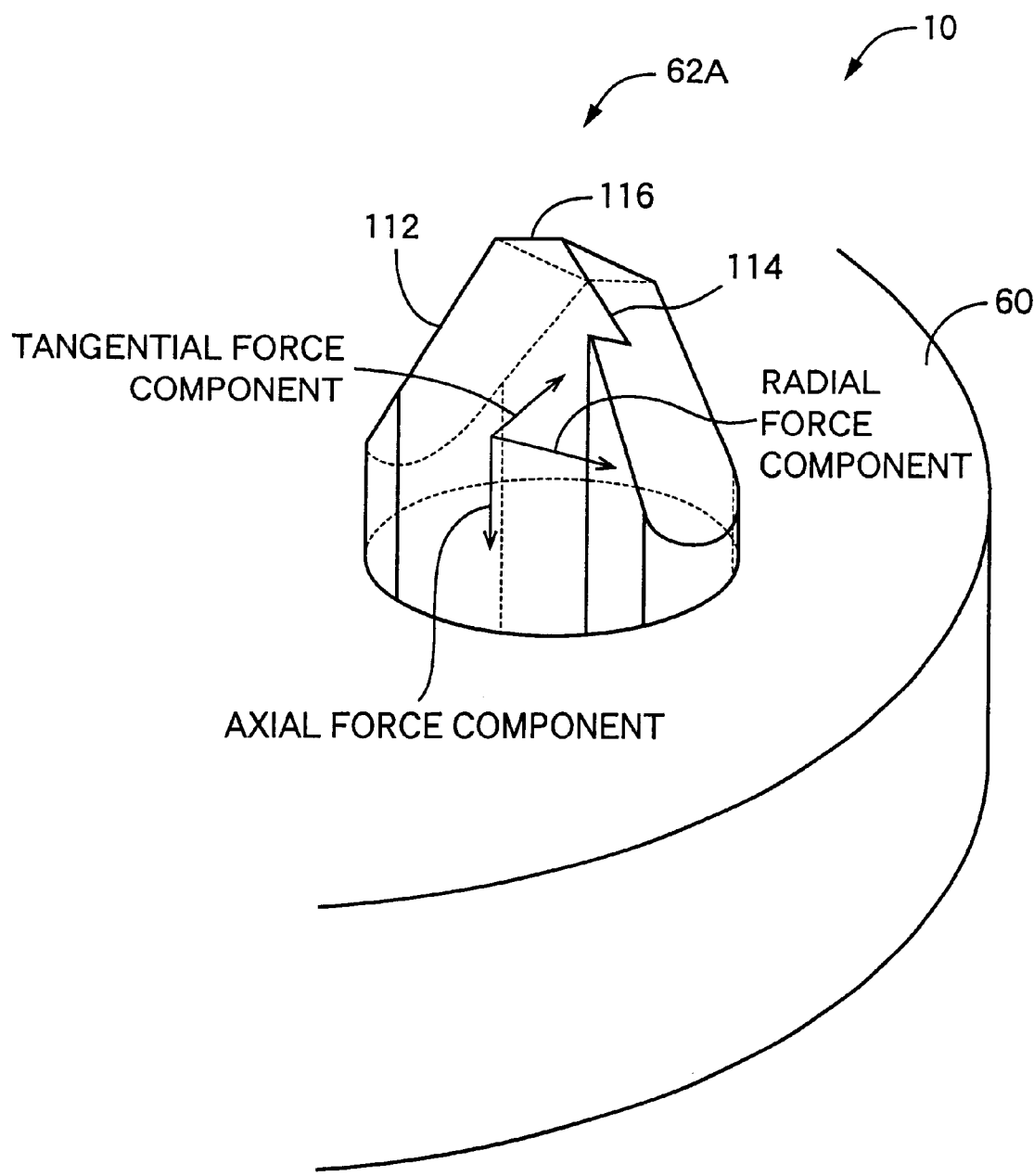
FIG. 10 is a view for explaining a cutting resistance acting on the cutting blade during a cutting operation.

During an operation for machining the workpiece in the form of a gear blank with the face milling cutter 10 attached to the gear forming machine 20, a cutting resistance is applied to each cutting blade 62 from the gear blank. The cutting resistance consists of a resultant force including a radial force component, a tangential force component and an axial force component, as shown in FIG. 10. All of the three force components are received by the inner circumferential surface of the cutting-blade receiving bore 70 and the cam surface 84 of the clamping member 80. The cutting blade 62, which is pressed by the cam surface 84 onto the inner circumferential surface of the cutting-blade receiving bore 70, is held in pressing contact at two portions of its outer circumferential surface which are circumferentially adjacent to respective widthwise opposite edges of the second flat surface 102, with respective two portions of the inner circumferential surface of the cutting-blade receiving bore 70. In other words, the cutting blade 62 is held in pressing contact at the two portions of the outer circumferential surface with the respective two portions of the inner circumferential surface of the cutting-blade receiving bore 70, wherein two tangential planes at the respective two portions of the inner circumferential surface are inclined in respective directions opposite to each other. In this arrangement, a wedge effect is provided between the two portions of the outer circumferential surface of the cutting blade 62 and the two portions of the inner circumferential surface of the cutting-blade receiving bore 70, whereby the cutting blade 62 is prevented from being displaced relative to the main body 60 in the tangential direction as well as in the radial direction.

The tangential displacement of the cutting blade 62 due to the tangential force component of the cutting resistance is prevented by the cooperation of the cam surface 84 and the portions of the inner circumferential surface of the cutting-blade receiving bore 70 which are adjacent to the widthwise opposite edges of the second flat surface 102. The radial displacement of the cutting blade 62 due to the radial force component of the cutting resistance is prevented by the portions of the inner circumferential surface of the cutting-blade receiving bore 70 which are adjacent to the widthwise opposite edges of the second flat surface 102. The axial displacement of the cutting blade 62 due to the axial force component of the cutting resistance is prevented by a friction force acting between the cam surface 84 and the first flat surface 100 and a friction force acting between the outer circumferential surface of the cutting blade 62 and the inner circumferential surface of the cutting-blade receiving bore 70. Where the axial force component of the cutting resistance forces the cutting blade 62 in a direction away from the axially distal end face 71 of the main body 60 toward the axially proximal end face of the main body, the friction force acting on the cam surface 84 forces the cylindrical clamping member 80 to be rotated in the clockwise direction (as viewed in FIG. 3), i.e., in such a direction that causes the eccentric cam portion 86 of the clamping member 80 is placed in a "self-locking state" for locking or firmly holding the cutting blade 62 against the axial force component of the cutting resistance. In other words, when the cutting blade 62 is forced in the rearward direction, the clamping member 80 is forced to be rotated in the direction that increases the pressing force applied from the cam surface 84 to the cutting blade 62, whereby the cutting blade 62 is held by the increased force.

In the present face milling cutter 10, the main body 60 and the cylindrical clamping member 80 are commonly used for various cutting operations in which various cutting blades having respective different shapes, e.g., different rake angles, thereby eliminating a cumbersome and time-consuming operation to change or modify the shape of the clamping member 80 depending upon the shape of the cutting blade.

While the presently preferred embodiment of this invention has been described in detail, for illustrative purpose only, it is to be understood that the present invention is not limited to the details of the illustrated embodiment, but may be otherwise embodied.

In the above-illustrated embodiment, all the cutting-blade receiving bores 70 open in the respective portions of the end face 71 of the main body 60 which are located on the single circle, and the inside and outside cutting blades 62A, 62B are alternately arranged as viewed in the circumferential direction. The inside and outside cutting blades 62A, 62B are formed to be different from each other in the arrangement of the cutting edge, such that a cutting point of the inside cutting blade 62A is offset from the axis of the cutting blade 62A inwardly in the radial direction of the main body 60 when the cutting blade 62A is received in the cutting-blade receiving bore 70, while a cutting point of the outside cutting blade 62B is offset from the axis of the cutting blade 62B outward in the radial direction of the main body 60 when the cutting blade 62B is received in the cutting-blade receiving bore 70. However, the cutting-blade receiving bores may be located on two mutually concentric circle having respective diameters different from each other, such that radially inner and outer ones of the cutting-blade receiving bores for receiving therein the respective inside and outside cutting blades are alternately arranged as viewed in the circumferential direction. In this case, the inside and outside cutting blades 62A, 62B may be formed to be identical with each other in the arrangement of the cutting edge. Further, an increased number of the cutting-receiving bores can be formed for receiving an increased number of the cutting blades, without an increase in the diameter of the main body. It is noted that the above-described cutting point of the inside cutting blade 62A may be interpreted to correspond to an intersection point at which the cutting edges 112, 116 intersect with each other.

While the central angle of the second flat surface 102 is about 90° in the above-illustrated embodiment, this central angle may be changed within a range of 80°–100° or a range of 70°–120°.

Figure 11:
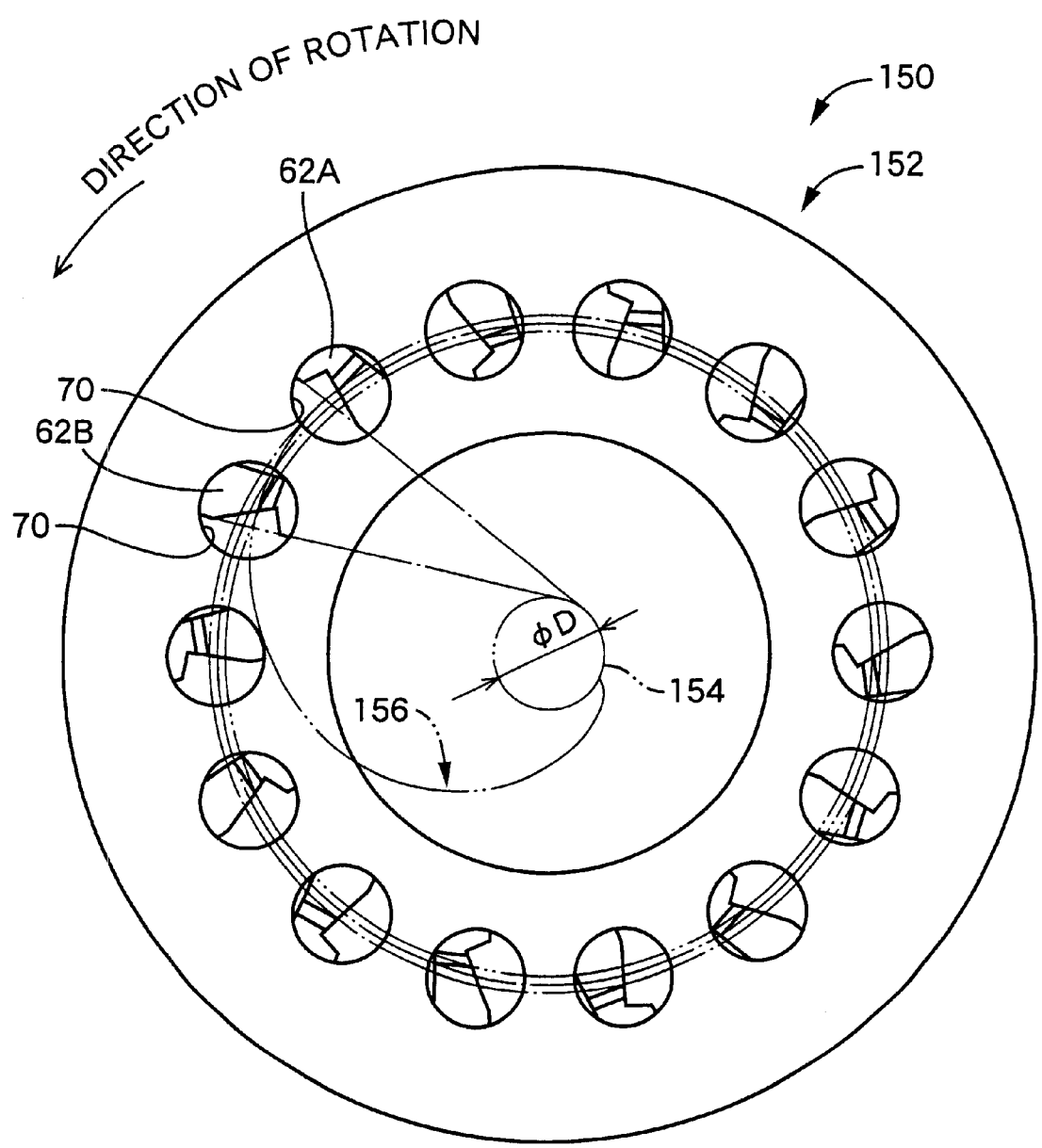
FIG. 11 is a front view of a face hobbing cutter constructed according to another embodiment of the invention.

FIG. 11 shows a cutter head assembly in the form of a face hobbing cutter 150 which is constructed according to another embodiment of this invention. Like the above-described face milling cutter 10, this face hobbing cutter 150 is advantageously used in a gear cutting operation in which a bevel gear having curved teeth is cut in accordance with a forming method (non-generating method) or generating method. The cutting-receiving bores 70 are formed to be positioned on a single circle whose center lies on the axis of a main body 152 of the face hobbing cutter 150. The inside and outside cutting blades 62A, 62B are received in the respective bores 70, so as to be alternately arranged in the circumferential direction. The cutting blades 62A, 62B consist of seven pairs each consisting of one inside cutting blade 62A and one outside cutting blade 62B. Each pair of the inside and outside cutting blades 62A, 62B, which are adjacent to each other in the circumferential direction of the main body 152, are positioned relative to the main body 152 such that cutting edges of the respective inside and outside cutting blades 62A, 62B are arranged along the corresponding one of seven involutes 156 of a base circle 154 which has a diameter of D and a center lying on the axis of the main body 152. The first flat surface 100 of each cutting blade 62 is positioned to extend along a tangential line tangent to the base circle 154. Each clamping-member receiving bore 72 extends in a direction parallel to the first flat surface 100, i.e., in a direction inclined with respect to a plane perpendicular to a tangential plane that is tangent, at the opening of the bore 72, to the outer circumferential surface of the main body 152.

Figure 12:
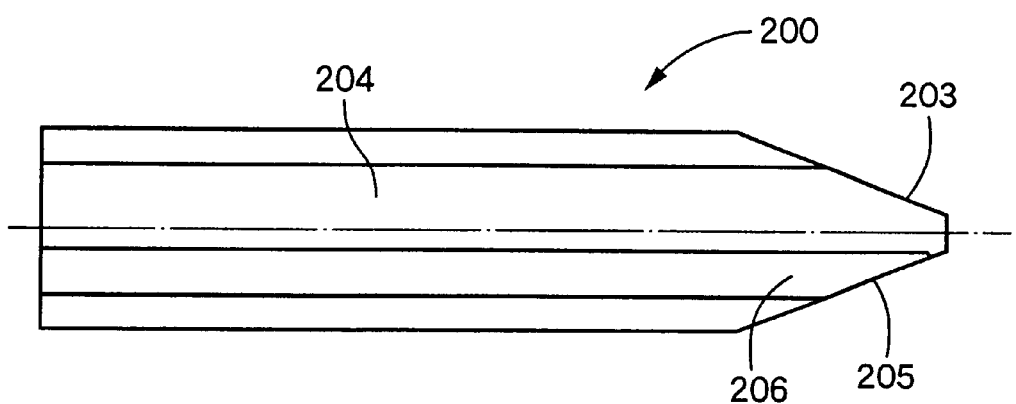
FIG. 12 is a front view of another cylindrical cutting blade which is different in shape from the cylindrical cutting blade which is shown in FIGS. 3, 4 and 7–10.
Figure 13:
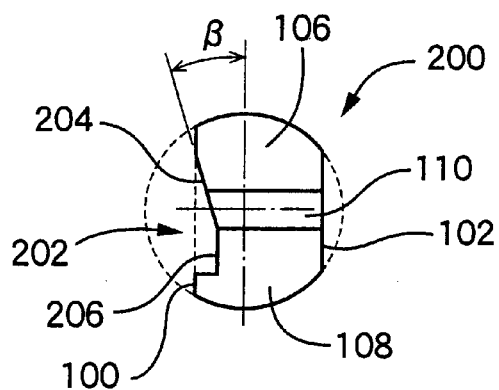
FIG. 13 is a plan view of the cylindrical cutting blade of FIG. 12.

FIGS. 12–13 show a cylindrical cutting blade 200 which is different from the above-described cylindrical cutting blade 62 in that the cutting blade 200 has a rake face 202 which consists of two flat surface, i.e., first and second rake faces 204, 206. The first rake face 204 provides a cutting edge 203 which is defined by the intersection of the first rake face 204 and the flank face 106 and which usually serves to cut the workpiece. The second rake face 206 provides a cutting edge 205 which is defined by the intersection of the second rake face 206 and the flank face 108 and which usually does not serve to cut the workpiece. The first rake face 204 is inclined with respect to the first and second flat surfaces 100, 102 so as to have a positive rake angle β as the above-described rake face 104, while the second rake face 206 is parallel to the first and second flat surfaces 100, 102. In this arrangement, it is possible to increase the rake angle β while avoiding reduction in an rigidity of the cutting blade and facilitating removal of cutting chips produced in a cutting operation.

The second rake face 206 does not have to be necessarily parallel to the first flat surface 100, but may be inclined with respect to the first flat surface 100 by an angle smaller than the angle by which the first rake face 204 is inclined with respect to the first flat surface 100, or may be inclined in a direction opposite to the direction in which the first flat surface 100 is inclined. In the cutting blade 200, the first rake face 204 which is brought into engagement with the workpiece has the required positive rake angle, while the second rake face 206 which is not usually brought into engagement with the workpiece has a small positive rake angle or a negative rake angle. Such a small rake angle or negative rake angle of the second rake face 206 leads to an increase in the thickness of the cutting blade 200, improving an rigidity of the cutting blade 200. It is noted that the rake face 202 may consist of more than two flat surfaces, or may consist of a single curved surface.

While there have been described embodiments in which the principle of the present invention is applied to the face milling cutter and the face hobbing cutter, it is to be understood that the invention is not limited to these cutters for cutting a gear, and that the principle of the invention is also applicable to any other cutting tool, for example, for boring a bore, machining a flat surface and machining an outer circumferential surface. That is, the cutter head assembly of the invention can be used as any one of various kinds of cutting tools which are used in various kinds of machines such as a lathe, a milling machine, a boring machine, etc. It is to be further understood that the present invention may be embodied with various other changes, modifications and improvements, such as those described in the SUMMARY OF THE INVENTION, which may occur to those skilled in the art, without departing from the spirit and scope of the invention defined in the following claims:

What is claimed is:

1. A cutter head assembly for cutting a workpiece, comprising:
    a main body which is to be rotated about an axis thereof, and which has at least one cutting-blade receiving bore offset from said axis and extending from an axially distal end face of said main body toward an axially proximal end face of said main body, said main body further having at least one clamping-member receiving bore unparallel to said cutting-blade receiving bore and partially interfering with said cutting-blade receiving bore;
    at least one generally cylindrical cutting blade each received in a corresponding one of said at least one cutting-blade receiving bore and having a flat surface formed as a part of an outer circumferential surface thereof and parallel to an axis of said cutting blade, said cutting blade further having a cutting edge in an axially distal end portion thereof which projects from said axially distal end face of said main body; and
    at least one generally cylindrical clamping member each received in a corresponding one of said at least one clamping-member receiving bore and having a fitting portion and a cam portion, said cylindrical clamping member being fitted at said fitting portion in said clamping-member receiving bore, said cam portion having a cam surface whose radial distance from an axis of said fitting portion changes in a circumferential direction of said cylindrical clamping member,
    wherein said cylindrical clamping member is rotated about said axis of said fitting portion, for thereby selectively establishing a clamping state in which said cam surface is brought into contact with said flat surface of said cutting blade so as to press said cutting blade onto an inner circumferential surface of said cutting-blade receiving bore, and an unclamping state in which said cam surface is separated from said flat surface of said cutting blade.

2. A cutter head assembly according to claim 1, wherein said cylindrical cutting blade has a cutout formed in said outer circumferential surface such that said cutout extends in a direction parallel to said axis of said cutting blade and is diametrically opposite to said flat surface.

3. A cutter head assembly according to claim 1, wherein said cylindrical cutting blade has a second flat surface in addition to said flat surface as a first flat surface, said second flat surface being formed as a part of said outer circumferential surface of said cutting blade and parallel to said first flat surface.

4. A cutter head assembly according to claim 1, wherein said fitting portion of said cylindrical clamping member is provided by each of axially opposite end portions of said cylindrical clamping member, while said cam portion of said cylindrical clamping member is provided by an axially intermediate portion of said cylindrical clamping member.

5. A cutter head assembly according to claim 1, wherein said cam portion of said cylindrical clamping member consists of an eccentric cam portion which has a circular shape in cross section taken in a plane perpendicular to an axial direction of said cylindrical clamping member and which has an axis offset from said axis of said fitting portion.

6. A cutter head assembly according to claim 1, further comprising a clamping-member-removal preventing device which prevents removal of said cylindrical clamping member from said clamping-member receiving bore.

7. A cutter head assembly according to claim 1, further comprising an angular-displacement limiting device which defines a maximum angle over which said cylindrical clamping member is rotatable relative to said clamping-member receiving bore.

8. A cutter head assembly according to claim 1, further comprising a limiting member which is fixed to said main body and which has an engaging portion in a distal end portion thereof,
    wherein said cylindrical clamping member has an engaging groove which is formed in an outer circumferential surface of said fitting portion and which extends over a predetermined distance in a circumferential direction of said cylindrical clamping member, and wherein said limiting member is engaged at said engaging portion with said engaging groove.

9. A cutter head assembly according to claim 1, wherein said cutting edge is defined by an intersection of a rake face and a flank face which are formed in said cylindrical cutting blade, and wherein said rake face is parallel with said axis of said cylindrical cutting blade.

10. A cutter head assembly according to claim 9, wherein said flat surface has an entire width as measured in a width direction perpendicular to said axis of said cylindrical cutting blade, and a recessed portion formed therein and elongated in a direction parallel to said axis of said cylindrical cutting blade, said recessed portion having a width as measured in said width direction, which width is smaller than said entire width, said rake face being provided by said recessed portion.

11. A cutter head assembly according to claim 10, wherein said recessed portion is formed in a widthwise intermediate portion of said flat surface.

12. A cutter head assembly according to claim 9, wherein said rake face consists of a single surface.

13. A cutter head assembly according to claim 9, wherein said rake surface consists of a plurality of surfaces which intersect with each other.

14. A cutter head assembly according to claim 1, wherein said at least one clamping-member receiving bore includes a plurality of bores which interfere with respective portions of each of said at least one cutting-blade receiving bore, and wherein said respective portions are spaced apart from each other in an axial direction of said each of said at least one cutting-blade receiving bore.

15. A cutter head assembly according to claim 1, wherein said main body consists of a disk-shaped body whose center line lies on said axis about which said main body is to be rotated;

wherein said at least one cutting-blade receiving bore consists of a plurality of bores which are arranged in a circumferential direction of said disk-shaped body;

and wherein said at least one generally cylindrical cutting blade consists of a plurality of cutting blades which are respectively received in said plurality of bores.

16. A cutter head assembly according to claim 15, wherein said plurality of bores are located on at least one circle whose center lies on said axis of said main body.

17. A cutter head assembly according to claim 15, wherein said plurality of cutting blades consist of at least one pair of inside and outside cutting blades which are adjacent to each other in said circumferential direction, and wherein the cutting edges of said at least one pair of inside and outside cutting blades are arranged along an involute of a base circle whose center lies on said axis of said main body.

18. A cutter head assembly according to claim 15, wherein said plurality of cutting blades includes an inside cutting blade and an outside cutting blade, said inside cutting blade cutting said workpiece by a portion of said cutting edge which portion is closer to said axis of said main body than the other portion of said cutting edge, said outside cutting blade cutting said workpiece by a portion of said cutting edge which portion is more distant from said axis of said main body than the other portion of said cutting edge.

19. A cutting blade having a generally cylindrical body including an outer circumferential surface which is constituted by a first flat surface, a second flat surface and part-cylindrical surfaces, wherein said first and second flat surfaces are spaced from each other by said part-cylindrical surfaces as viewed in a circumferential direction of said cutting blade, and are parallel to an axis of said cutting blade, said cutting blade further having, in one of axially opposite end portions thereof, a cutting edge defined by an intersection of a rake face and a flank face which are formed in said cutting blade.

20. A cutter head assembly, comprising:

a main body which has at least one cutting-blade receiving bore and at least one clamping-member receiving bore unparallel to said cutting-blade receiving bore and partially interfering with said cutting-blade receiving bore;

at least one generally cylindrical cutting blade each received in a corresponding one of said at least one cutting-blade receiving bore, said cutting blade having two flat surfaces formed as respective parts of an outer circumferential surface thereof and having respective widths as measured in a direction parallel to a radial direction of said cylindrical cutting blade, said two flat surfaces being parallel to each other and parallel to an axis of said cutting blade, said cutting blade further having a cutting edge in an axially distal end portion thereof which projects from an end face of said main body, said cutting edge being defined by an intersection of a flank face which is formed in said axially distal end portion, and a rake face which is formed in a widthwise intermediate portion of one of said two flat surfaces and which is parallel to said axis of said cutting blade; and at least one generally cylindrical clamping member each received in a corresponding one of said at least one clamping-member receiving bore and having a fitting portion and a cam portion, said cylindrical clamping member being rotatably fitted at said fitting portion in said clamping-member receiving bore, said cam portion having a cam surface whose radial distance from an axis of said fitting portion changes in a circumferential direction of said cylindrical clamping member.

21. A cutter head assembly, comprising:

a main body which is to be rotated about an axis thereof, and which has at least one cutting-blade receiving bore receiving therein a cutting blade, said cutting-blade receiving bore being offset from said axis and extending from an axially distal end face of said main body toward an axially proximal end face of said main body, said main body further having at least one clamping-member receiving bore unparallel to said cutting-blade receiving bore and partially interfering with said cutting-blade receiving bore; and at least one generally cylindrical clamping member each received in a corresponding one of said at least one clamping-member receiving bore and having a fitting portion and a cam portion, said cylindrical clamping member being fitted at said fitting portion in said clamping-member receiving bore, said cam portion having a cam surface whose radial distance from an axis of said fitting portion changes in a circumferential direction of said cylindrical clamping member, wherein said cylindrical clamping member is rotated about said axis of said fitting portion, for thereby selectively establishing a clamping state in which said cam surface is brought into contact with an outer circumferential surface of said cutting blade received in said cutting-blade receiving bore so as to press said cutting blade onto an inner circumferential surface of said cutting-blade receiving bore, and an unclamping state in which said cam surface is separated from said outer circumferential surface of said cutting blade.

22. A cutting blade according to claim 19, consisting of a gear cutting blade for cutting a gear.

* * * * *